Patented Jan. 5, 1932

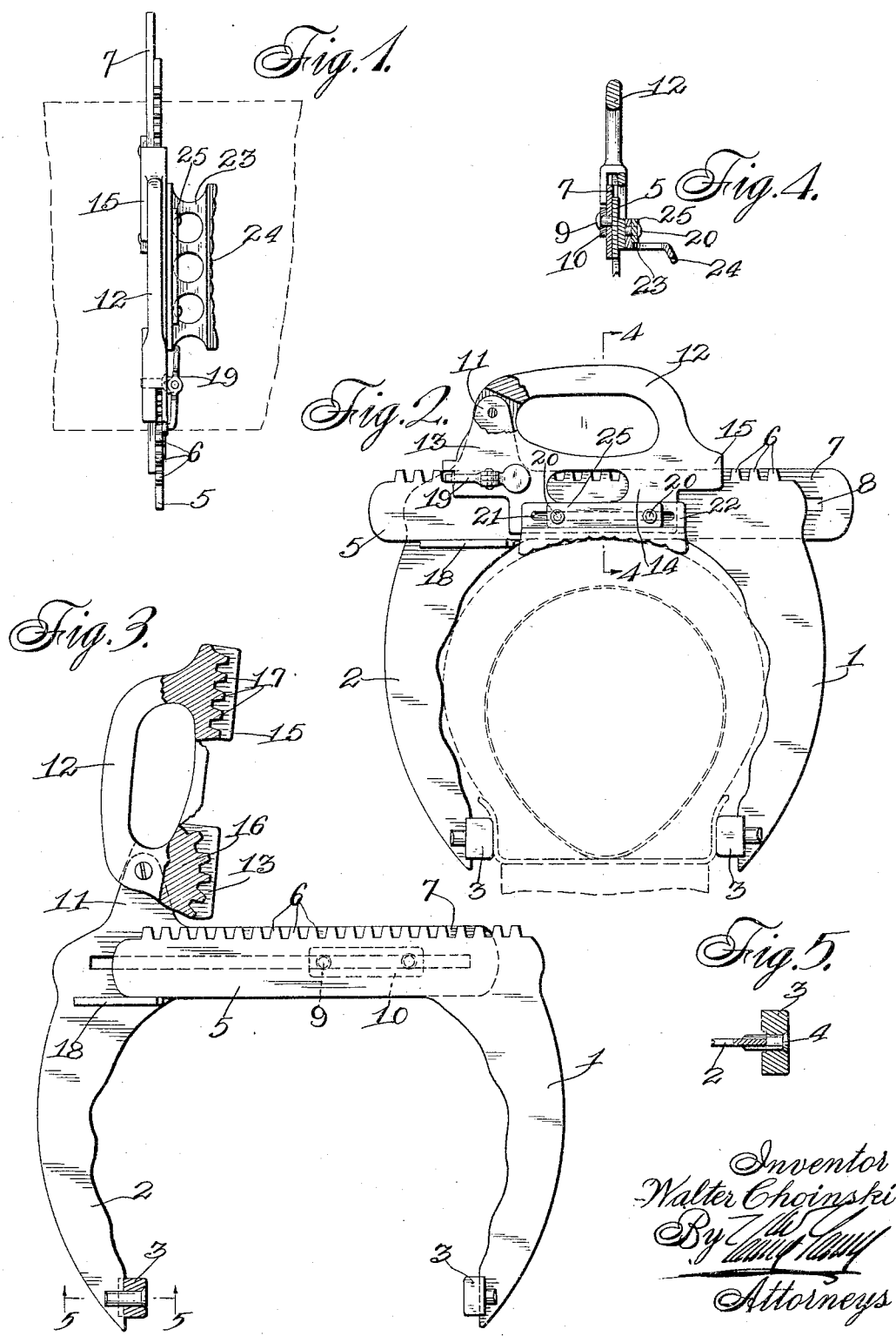

1,839,951

UNITED STATES PATENT OFFICE

WALTER CHOINSKI, OF MILWAUKEE, WISCONSIN

TIRE CLAMP

Application filed January 1, 1931. Serial No. 505,997.

This invention relates to improvements in tire clamps and more particularly adapted for use as a tire and rim remover.

One of the objects of the present invention is the provision of a tire clamp so constructed and arranged that it can be quickly clamped on to a tire rim to facilitate the removing of the tire, and the rim from the wheel, whereby the rim and the tire are readily loosened and removed from the wheel.

Another object of the present invention is the provision of a tire clamp which comprises adjustable clamping members adapted to engage the rim, and a tire, together with means for moving the clamping members toward each other for engaging them with a tire rim, and means for locking the clamping members in engagement with the rim, whereby force can be applied to the clamp and the rim and tire to facilitate the removal of the rim from the wheel.

A further object of the present invention is the provision of a tire clamp including opposed clamping members adjustably connected, with one of said members carrying a rack bar and the other of said members having a pivoted handle attached thereto with rack teeth carried by the handle and adapted to cooperate with the rack bar, and moving said clamping members toward each other to engage them with a tire rim, said clamping members being provided with roughened engaging surfaces for engagement with the exterior of a tire.

With the above and other objects in view, the invention consists in the novel features of construction, the combination and arrangement of parts hereinafter more fully set forth, pointed out in the claims and shown in the accompanying drawings wherein:

Figure 1 is a top plan view of my improved clamp;

Figure 2 is a side elevation illustrating the application of the clamp to the tire and rim, with parts thereof broken away and illustrated in cross section;

Figure 3 is a view similar to Figure 2, illustrating the clamping members in open position with the handle in a raised position;

Figure 4 is a transverse sectional view taken on the line 4—4 of Figure 2; and,

Figure 5 is a detailed sketch on the line 5—5 of Figure 3.

In the construction of my improved clamp, opposed arcuate clamping members 1 and 2 are provided at their outer ends with engaging shoes 3. The engaging shoes 3 are attached to the clamping members by means of rivets 4, the ends of which are split and positioned upon opposite sides of the faces of the clamping members and welded or otherwise secured thereto as shown in Figure 5. At the inner end of the clamping member 1, a lateral arm 5 is provided and at the outer edge of this arm rack teeth 6 are arranged.

The clamping member 2 is also provided with a lateral arm 7 arranged parallel and in intimate engagement with the arm 5. The arm 7 is provided with a longitudinal slot 8 in which are removably positioned pins 9 carried by the arm 5 and which support a retaining plate 10. The retaining plate 10 is arranged on the outer face of the arm 7 whereby the two arms 5 and 7 are adjustably connected to provide for adjustment of said clamping members 1 and 2 toward and away from each other.

Extending upwardly from the body of the clamping member 2 and at the inner end of the arm 7 is a supporting ear 11, and the handle 12 is provided with plate-like members 13, arranged upon opposite sides of the ear 11 and pivotally connected thereto. The plate-like members 13 extend inwardly and are arranged upon opposite sides of the arms 5 and 7, to guide the arms in their movement and prevent lateral movement of said arms relative to each other.

The plate members 13 are connected by means of plate members 14 with spaced ears 15 and it will be noted that the members 14 and 15 are arranged upon opposite sides of the arms 5 and 7 thus forming a guide for the arms 5 and 7 and retaining them against lateral movement. Arranged between the plates 13 is an arcuate gear segment 16, adapted to cooperate with the rack teeth 6 for moving the arm 5 longitudinally along the arm 7. Arranged between the spaced ears 15 are the rack teeth 17 which also cooperate with rack teeth 6 to assist the gear segment 16 in moving the arm 5 longitudinally relative to arm 7.

In applying the clamp to a tire and its rim, the handle member 12 is swung upwardly, to the position shown in Figure 3, so that the arms 5 and 7 which carry the clamping members 1 and 2 can be moved independently. When the clamping members are not in position as shown in Figure 3, they can be quickly engaged over a tire so that the shoes 3, which are carried by the clamping members can be positioned opposite the side edges of the rim. When the arms 5 and 7 are in an extended position, the outer end of arm 5 is supported by means of a flange 18 carried by the clamping member 2. After the clamping members 1 and 2 have been correctly positioned upon opposite sides of the tire, the handle member is then moved downwardly toward arms 5 and 7 with the gear segments 16 engaging the rack teeth 6 causing arms 5 and 7 to move in opposite directions, and as the handle continues with the downward movement, the teeth 17 will also engage the teeth 6 for imparting a last adjustable movement to arms 5 and 7, so as to tightly clamp the shoes 3 to the tire rim, as shown in Figure 2.

It will be noted that the inner or engaging surfaces of the clamping members 1 and 2, are provided with roughened surfaces, forming raised engaging points which engage the side walls of the tire to grip the tire so that the clamping members can be moved in a lateral or axial direction. When the handle 12 is in its operative position, as shown in Figure 2, the arms 5 and 7 are retained against movement by means of a pivoted catch member 19 carried by one of the plate-like members 13. When it is desired to remove the clamping members 1 and 2, the catch 19 is removed from engagement with one of the teeth 6 to permit upward swinging movement of the handle 12 and releasing arms 5 and 7.

The plate member 14 on one side of the arms carries spaced pins 20 positioned in a slot 21 formed in the vertical portion 22 of bracket 23. The bracket 23 is provided with an inclined portion at its outer edge which has a corrugated lower face indicated at 24, and this corrugated face is slightly arcuate to conform to the contour of the upper surface of the tire. The bracket 23 is retained in position relative to the arm 5 by means of a clamping plate 25 carried by the pins 20 and bridging the slot 21. It will be noted that by engaging the surface 24 with the upper surface of the tire, the tire can be moved circumferentially by imparting a lateral movement to the handle 12. This surface 24, on bracket 23 will also aid in moving the tire laterally, in order to assist in loosening the rim.

It will be apparent from the foregoing that I have provided a simple and inexpensive clamping device adapted to be engaged with a tire, and its rim, whereby the tire and rim can be quickly loosened from the wheel by imparting lateral and circumferential movement to the tire and rim. The device is so constructed that it can be adjusted for application to tires of various sizes and the adjustment of the device is such that it can be quickly and easily clamped to the tire and rim, whereby force can be asserted in loosening the tire and rim from the wheel. Attention is also directed to the fact that when the device is in clamping position, as shown in Figure 2, the catch member 19 will securely hold the same in this position until manually released.

I claim:

1. A tire clamp including opposed clamping members, engaging shoes at the outer ends thereof, lateral arms at the inner ends thereof, said arms being arranged in parallel relation with means connecting said arms to permit adjustment thereof, means carried by one of said arms and cooperating with the other arm for moving said clamping members toward and away from each other, means for retaining said clamping members in locked positions and a clamping bracket movably supported upon said arms and adapted to cooperate with the clamping members for engaging a tire.

2. A tire and rim removing device comprising a pair of clamping members for engaging transversely over a tire, each of said clamping members including an arcuate tire gripping leg and an inwardly directed arm, means slidably connecting the arms together, shoes secured to the outer ends of the legs, one of said arms being provided at its outer surface with rack teeth, a pivoted handle rockably carried by the other of said arms having formed thereon a gear segment for engaging the rack teeth at its inner end and a set of rack teeth at its outer end for engaging the first mentioned rack teeth, and a pivoted catch carried by said handle for engaging certain of the first mentioned rack teeth after adjustment of the clamping members by said handle.

In testimony that I claim the foregoing I have hereunto set my hand at Milwaukee, in the county of Milwaukee and State of Wisconsin.

WALTER CHOINSKI.